United States Patent [19]

Disselbeck et al.

[11] 4,289,628

[45] Sep. 15, 1981

[54] PROCESS FOR SEPARATING SOLIDS FROM LIQUID MATTER

[75] Inventors: Dieter Disselbeck, Bad Soden am Taunus; Rudolf Richter, Hünstetten, both of Fed. Rep. of Germany

[73] Assignee: Hoechst Aktiengesellschaft, Frankfurt am Main, Fed. Rep. of Germany

[21] Appl. No.: 154,068

[22] Filed: May 28, 1980

[30] Foreign Application Priority Data

Jun. 5, 1979 [DE] Fed. Rep. of Germany ....... 2922778

[51] Int. Cl.$^3$ .............................................. B01D 23/04
[52] U.S. Cl. .................................... 210/703; 210/705; 210/804
[58] Field of Search ............... 210/703, 705, 767, 777, 210/778, 804

[56] References Cited

U.S. PATENT DOCUMENTS 3,977,970  8/1976  Willis et al. ......................... 210/703

*Primary Examiner*—Ivars C. Cintins
*Attorney, Agent, or Firm*—Hammond & Littell, Weissenberger and Muserlian

[57] ABSTRACT

The invention relates to a process for separating solids from liquid matter by means of gravity, using a three-dimensional filter element and an alluvial filter layer wherein a gas is fed into the medium to be treated prior to its introduction into the filter element in the form of fine or finest bubbles which accumulate on the solid particles. The particles loaded with air floated up rapidly to the upper level of the column of liquid in the filter element, forming a layer of sludge. Said layer built up continuously an alluvial filter layer at the internal surface of the water-permeable supporting filter element from the bottom upwards along the wall relative to the rising level of the liquid in the filter element. The process, realized in the presence or absence of flocculating agents, results in a higher separation degree with regard to the solids content as well as an increased elimination of the biological oxygen demand.

9 Claims, No Drawings

PROCESS FOR SEPARATING SOLIDS FROM LIQUID MATTER

A device for the purification of waste water by means of a fabric secured in a fixing device has been described in German Offenlegungsschrift No. 2,621,698, wherein the fabric is bag-shaped and has been constructed as a suspended supporting fabric for a primary filter layer of separated solids formed at its internal surface.

The degree of separation or the effect of purification with regard to the solids content of the filtrate which may be obtained with this device depends on the quality of the formation of the primary filter layer or alluvial filter layer at the fabric. Hence, it is an object of the invention to ensure the optimum formation of the alluvial filter layer in each phase of the filtering process.

This task is solved according to the invention by feeding a gas to the medium to be separated prior to introducing the same into the filter element. Surprisingly, the solids of the medium to be separated are thereby caused to float in the filter element and form a layer of sludge on the surface of the column of liquid. This layer is built up continuously with a rising column of liquid at the internal surface of the water-permeable supporting filter bag from the bottom upwards along the fabric as an alluvial filter layer of material formed by accumulation of the separated solids of the waste water to be purified.

In the process according to the invention it is possible to treat waste water currents not having been conditioned with flocculating agents and solids-containing liquids of any kind with or without flocculating agents.

According to the present invention there is provided a process for separating solids from liquid matter by means of gravity, a three-dimensional filter element wherein a column of the medium to be separated is formed and an alluvial filter layer obtained by accumulation of the separated solids, which adheres to the internal surface of the filter element, wherein a gas has been fed to the medium to be separated prior to its introduction into the filter element and whereby a layer of the separated solids is formed at the surface of the column of the medium to be separated: said layer is transformed into an alluvial filter layer built up continuously at the internal surface of the filter element by means of the rising level of the liquid.

Furthermore, it has become evident that said process generally permits the use of a fabric high porosity, preferably with a permeability of up to 1000 $l/dm^2 \times min$ of air at a difference of pressure of 2 mbar. Use may also be made of perforated flat articles of suitable materials which have been processed into bag-shaped elements.

Suitable materials for fabrics and perforated flat articles are synthetic materials which are of high strength and resistance to aggressive substances and offer a long service life. Particularly advantageous are fabrics of filament and/or fiber yarns made of synthetic fibers (multi- and/or monofilament). Especially suitable are those of threads of polyester, such as polyethylene terephthalate, polybutylene terephthalate, poly-1,4-dimethylol-cyclohexane terephthalate or of analogous products based on isophthalic acid, polyamides such as poly-(hexamethylene-adipic acid amide), polyhexamethylene-sebacic acid amide, polyundecanoic acid amide, polycaprolactam, and also poly-p-phenylene terephthalamide. Fabrics made from fibers of polyacrylonitrile and of copolymers of acrylonitrile and at least one further monomer, the acrylonitrile content of which is at least 85%, are also suitable. Use may also be made of perforated flat articles of polyethylene, polypropylene and sheets of polyester.

The gas used for carrying out the process of the invention is preferably air, however, other gases, such as oxygen, nitrogen and carbon dioxide may also be used depending on the nature of the medium to be separated. Gaseous nitrogen and carbon dioxide are advantageously employed as inert gas for example for the treatment of media sensitive to oxidation, in which case it may be recommended to operate in closed systems.

The latter mode of operation is used preferably for media to be separated which contain compounds, which, when evaporated, from explosive mixtures in the presence of oxygen.

The amount of gas which is sucked in should be at most of such dimension that the solid particles of the media may be floated, but on the other hand only at such rate that the conveying capacity of the pump is not decreased. This requires injecting the necessary amount of gas in the form of fine or finest bubbles.

The different dimensions of the filter devices and the different kinds of the media to be separated have an influence on the amount of gas to be employed. Therefore the optimal amount of gas has to be adjusted in each case.

For this reason the gas is supplied preferably in the suction zone of the conveyor pump for the medium, where for example induction valves or frits which provide a controlled air suction have been arranged in the suction zone. Due to an injector effect the gas is entrained, it accumulates to the solids and effects the flotation.

If flocculating agents are employed for treating the medium to be separated, as it is sometimes advantageous, for example in the case of waste water, it has proved to be suitable to supply the gas in front of the point of introduction of the flocculating agents, which in many cases also helps to intensify the flocculation effect.

The process may be applied to various systems comprising solid and liquid matter, for example solids-containing waste waters and sludges, for example all types of municipal waste water and sewage sludges, such as raw or activated sludges, waste waters and sludges of industry, for example from abattoirs and meat-packing plants, pountry farms, dairies, fruit and vegetable preservation plants, railway repair units, electrolytic and hydroxide sludges and waste waters as well as those from ceramics industry, smelting plants, oil-producing or -converting industry, coal industry, paper industry, sugar industry, chipboard and wood fiber board manufacture, from wine-pressing plants and from grinding mills of various industries.

The process according to the invention may be applied also to purify natural surface water which is contaminated by a solids content. Communal waste water is the most preferred medium to be clarified.

The following Example illustrates the invention.

EXAMPLE

In a filtration plant for the purification of waste water, an induction valve was installed in the suction conduit of the pump conveying the waste water into the filter elements. The air taken in through the valve and fed into the waste water current accumulated in the form of air bubbles to the solid particles. The solid particles loaded with air floated by rapidly in the filter element, thus sealing the column of liquid with a sludge layer. Said sludge layer built up continuously as an alluvial filter layer at the internal surface of the water-permeable supporting filter bag from the bottom upwards along the fabric with the rising level of the column of liquid. The waste water employed had a solids content of 0.44 g/l and a biological oxygen demand ($BOD_5$ value) of 360 mg/l, whereas the filtrate showed a solids content of 0.02 g/l and a $BOD_5$ value of 77 mg/l following the treatment.

COMPARATIVE EXAMPLE

The above test was repeated, however, without feeding air to the waste water. The process of floating of the solid particles was not to be observed. The filtrate obtained showed a solids content of 0.086 g/l and a $BOD_5$ value of 120 mg/l.

The novel process resulted in a higher separation degree with regard to the solids content as well as an increased elimination of the biological oxygen demand.

What is claimed is:

1. A process for separating solids from liquid matter by gravity comprising feeding a gas into a liquid medium from which solid particles are to be separated whereby gas bubbles accummulate on the solid particles, introducing the liquid medium into a three dimensional filter element to form a column of the liquid medium in the filter element whereby the gas bubble-particles float to the upper level of the said column to form a layer of particles on the upper surface of the column and allowing the liquid matter to pass through the sides and bottom of the filter element while continuously building alluvial filter layers of the solids on the internal surface of the filter element from the bottom upwards along the filter wall relative to the rising level of the liquid medium in the filter element.

2. A process as claimed in claim 1, wherein air is used as the gas.

3. A process as claimed in claim 1 wherein an inert gas is fed to the medium to be separated which medium is sensitive to oxygen or forms explosive mixtures in the presence of oxygen.

4. A process as claimed in claim 1 wherein the gas is introduced into the liquid medium in a suction zone of a conveyor pump.

5. A process as claimed in claim 1, wherein the gas is injected in the form of fine bubbles.

6. A process as claimed in claim 1 wherein the gas is introduced into the liquid medium before the introduction of flocculating agents.

7. A process as claimed in claim 1, wherein solids containing liquids are clarified without the addition of flocculating agents.

8. A process as claimed in claim 1 wherein the liquid medium is waste water.

9. A process as claimed in claim 1 wherein the liquid medium is natural surface water.

* * * * *